United States Patent [19]

Ueda et al.

[11] 4,345,537
[45] Aug. 24, 1982

[54] APPARATUS FOR RESTRAINING AND BERTHING A FLOATING BODY

[75] Inventors: Shigeo Ueda; Yuji Fukuda, both of Yokohama, Japan

[73] Assignee: Bridgestone Tire Company Limited, Tokyo, Japan

[21] Appl. No.: 198,397

[22] Filed: Oct. 20, 1980

Related U.S. Application Data

[63] Continuation of Ser. No. 970,096, Dec. 15, 1978, abandoned.

[30] Foreign Application Priority Data

Dec. 26, 1977 [JP] Japan .............................. 52-156952
Jan. 14, 1978 [JP] Japan .............................. 53-3099

[51] Int. Cl.³ .............................................. B63B 59/02
[52] U.S. Cl. ........................................ 114/219; 405/215
[58] Field of Search ................... 114/219, 220, 230; 405/1, 4, 211, 212, 213, 214, 215, 218

[56] References Cited

U.S. PATENT DOCUMENTS

| | | | |
|---|---|---|---|
| 2,405,502 | 8/1946 | Harris | 114/219 |
| 3,864,922 | 2/1975 | Dial et al. | 405/215 |
| 3,974,794 | 8/1976 | Kakitani et al. | 114/230 |
| 4,137,861 | 2/1979 | Brummenaes | 114/219 |

FOREIGN PATENT DOCUMENTS

| | | | |
|---|---|---|---|
| 52-39280 | 3/1977 | Japan | 114/219 |
| 52-61100 | 5/1977 | Japan | 405/212 |
| 7449 | of 1897 | United Kingdom | 405/4 |
| 796440 | 6/1958 | United Kingdom | 405/215 |
| 250678 | 3/1970 | U.S.S.R. | 405/4 |

Primary Examiner—Edward R. Kazenske
Attorney, Agent, or Firm—Sughrue, Mion, Zinn, Macpeak & Seas

[57] ABSTRACT

An apparatus for restraining and berthing a floating body or vessel on a water surface at a quay wall, comprises a driving subsystem, a movable member driven by the driving subsystem and forwardly and backwardly guided by guide members, and an elastic end piece such as a marine fender secured to the movable member and projecting away from the quay wall. The apparatus according to the invention can exactly move the end piece to a desired position for restraining the floating body and can utilize precompressive forces arising in the end piece, thereby accommodating tolerances or unintensional errors of the quay wall in construction and absorbing rocking energy of the floating body to hold it firmly in place in a harbor. The apparatus according to the invention retracts its elastic piece in a rest or inoperative position and extends it in an operative position to be in contact with a floating body such as a ship or boat to serve as a marine fender.

3 Claims, 6 Drawing Figures

APPARATUS FOR RESTRAINING AND BERTHING A FLOATING BODY

This is a continuation of application Ser. No. 970,096 filed Dec. 15, 1978 (now abandoned).

BACKGROUND OF THE INVENTION

1. Field of the Invention

This invention relates to an apparatus for restraining and berthing a floating body on the surface of the water such as a floating oil tank, oil tanks, large barge, ship or the like to be fitted to a quay wall for the purpose of holding such a floating body at a given position on the surface of the water.

2. Description of the Prior Art

In the case of moving a floating body on the surface of the water to the quay wall, a rectangular pit is provided in the quay wall and the floating body on the surface of the water is moored in the pit. The floating body is moored to the quay wall by means of a rope or the like and is directly supported by a restraining device projected from the quay at a desired position to prevent the floating body from contacting with the quay for the purpose of safely mooring the floating body without damaging it under the influence of high waves and strong wind arising during the berthing of the floating body.

In practice, however, it is impossible to construct the quay wall precisely at a given position. As a result, the restraining device for directly supporting the floating body on the surface of the water is required to be adjustably moved in forward and backward directions by a distance which corresponds to tolerances or unintensional errors produced when the quay wall is constructed.

The means for adjusting the forward and backward position of the above mentioned restraining device, heretofore has been proposed as a hydraulic cylinder or a lift device employing a wire, chain or the like.

Both the hydraulic cylinder and the lift device have the drawback that they could not move the operative part of the restraining device up to the given position. In addition, the hydraulic cylinder could not lock the operative part of the restraining device to the given position. The lift device functions to adjust the forward and backward positions of the restraining device in general through an arcuate motion. As a result, the axial direction of the operative part of the restraining device is not coincident with the direction of operative force of the lift device. As seen from the above discussion, both the hydraulic cylinder and the lift device have the drawback that they could not exhibit sufficiently reliable restraining ability.

SUMMARY OF THE INVENTION

It is an object of the invention, therefore, to provide an apparatus for restraining and berthing a floating body on the surface of the water which can eliminate the above mentioned drawbacks and which can support the floating body at a given position in a reliable and resilient manner.

Another object of the invention is to provide an apparatus capable of exactly advancing an operating portion to a desired position for sufficiently restraining a floating body and utilizing precompressive forces arising in a fender supported on the end of the apparatus to accommodate tolerances or unintensional errors of the quay wall when constructed and to absorb rocking energy of the floating body to hold firmly it in place in a harbor.

A further object of the present invention is to provide an apparatus wherein an elastic end piece is extensible and retractable to serve as a marine fender for ship or boat.

The apparatus for restraining and berthing a floating body on a water surface at a quay wall according to the invention comprises driving means, a movable member driven by said driving means and forwardly and backwardly guided by guide means, and an elastic end piece secured to said movable member and projecting away from the quay wall.

Further objects and features of the invention will be fully understood from the following detailed description with reference to the accompanying drawings, wherein:

DETAILED DESCRIPTION OF THE PREFERRED EMBODIMENTS

Figure 1:
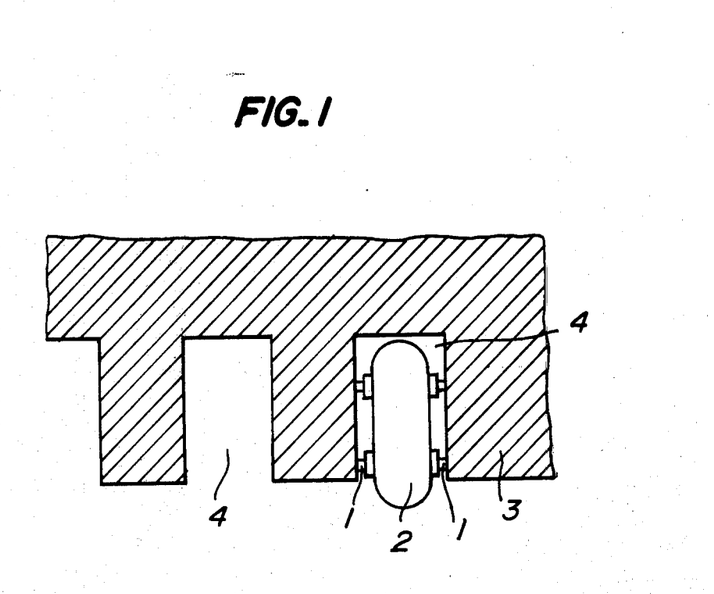
FIG. 1 is a plan view of a quay wall formed with rectangular pits for accommodating a floating body restrained by the apparatuses according to the invention.

Referring to FIG. 1 illustrating apparatuses 1 according to the invention for restraining a floating body 2 on a surface of the water to a quay wall 3, rectangular pits 4 are provided in the quay wall 3 and the floating body on the surface of the water is directly supported by the apparatuses 1 projected from the quay so as to prevent the floating body 2 from contacting the quay.

Figure 2:
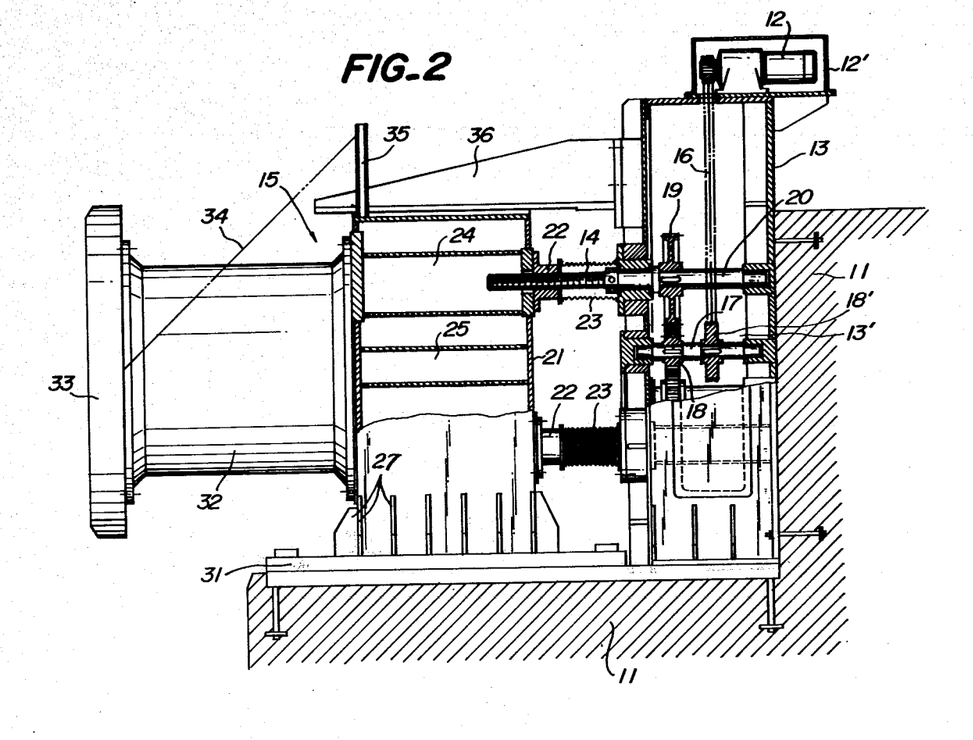
FIG. 2 is a front elevational view of one embodiment of a floating body restraining apparatus according to the invention, partly shown in section.

FIG. 2 shows one embodiment of a floating body restraining apparatus according to the invention, partly shown in section. Referring to FIG. 2, on a quay wall 11 is arranged the floating body restraining apparatus according to the invention which is provided thereon with driving means 12 such as a reversible geared motor housed in a casing 12' mounted on the top of a gear box 13 for receiving therein a gear train 13', at which output end is provided a screw treaded rod 14 rotatively driven through the gear train 13' by means of the geared motor 12. By rotations of the screw treaded rods 14 an operating part is moved toward and away from the quay wall.

In the present embodiment, the geared motor 12 is mounted to the quay wall 11 through a gear box 13 for accommodating the gear train 13'. Chains 16 extend around a gear of the geared motor 12 and a gear 18' of the gear train 13' and drive an idle shaft 17 provided thereon with a drive gear 18 which is adapted to engage with four driven gears 19 through idle gears (not shown). It is preferable to use the lower part of the gear box 13 as an oil reservoir for the purpose of splashing oil upwardly and lubricating all of the gears.

A driven shaft 20 for supporting each driven gear 19 is connected to the screw treaded rod 14. All of the screw treaded rods 14 are horizontally projected outwardly of the gear box 13 and have free ends threadedly engaged with a movable member 21 for an operating portion 15. In this embodiment, the movable member is in the form of a box-shaped configuration as a whole and is provided with internally threaded members 22 at locations in opposition to the respective screw threaded rods 14 to move in desired directions by the rotation of the screw threaded rods 14.

It should of course be appreciated that a pitch and a lead direction of the rods 14 and the threaded members 22 must be determined according to the arrangement of the gear trains 13' in the gear box 13 such that the movable member is always subjected to a constant amount of thrust in a constant direction. Trapezoidal threads are preferable for the threaded mmbers 14 and 22 because of their high strength.

In order to protect the rods 14 from rusting due to the sea water and other moisture, extensible and retractable tubular members 23 such as serpentine tubes are arranged between the gear box and the internally threaded members to surround the rods 14.

Figure 3:
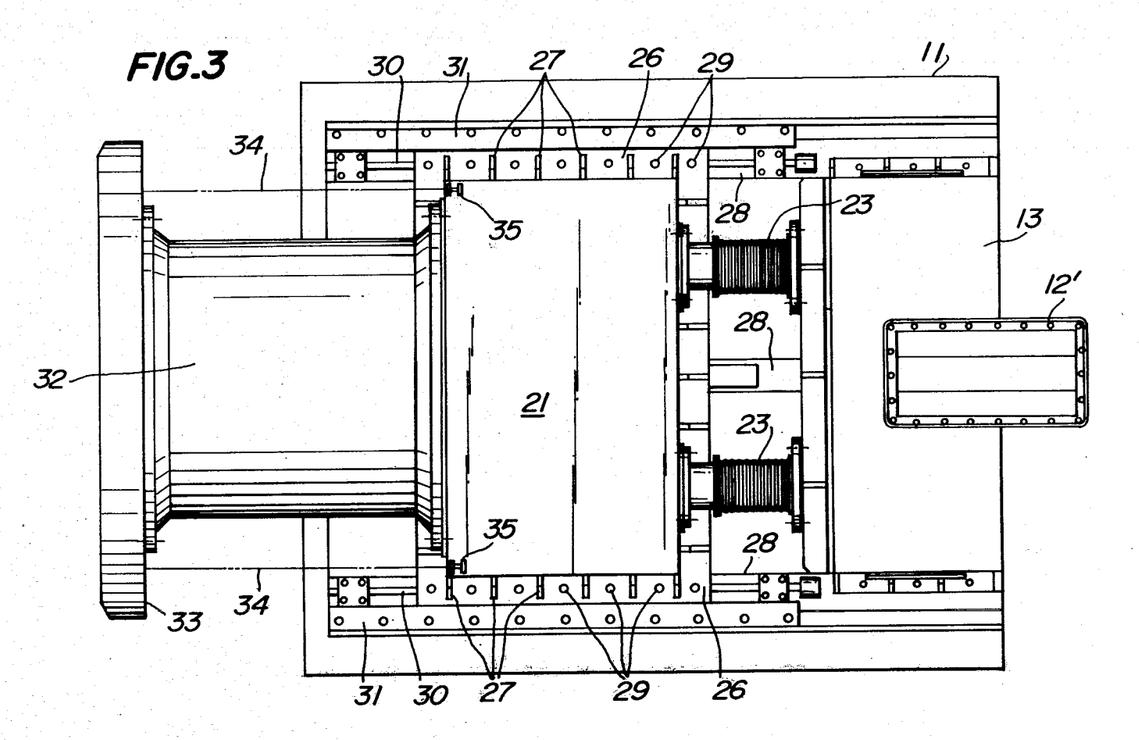
FIG. 3 is a plan view of the apparatus in FIG. 2.

In addition, four cylindrical members 24 are fixed to the inside of the box-shaped movable member 21 in axially alignment with the internally threaded members 22 to reinforce the movable member and to prevent the ends of the screw threaded rods 14 from exposing to any moisture and the like. Reference numeral 25 in FIG. 2 illustrates another reinforcement cylinder fixed to the movable member at the center thereof. The movable member 21 is provided about its bottom wall with flanges 26 reinforced by a plurality of ribs 27 as shown in FIG. 3. On rails 28 fixed to the quay wall 11 are arranged the flanges 26 so that the movable member 21 is guided by dovetail grooves 30 longitudinally formed in the rails during its movements toward and away from the quay wall. The dovetail grooves 30 serve to clamp the movable member 21 to the rails 28 with the aid of bolts and nuts 29 engaged in the dovetail grooves 30.

The bolts and nuts 29 and dovetail grooves 30 may be provided in sidewalls of the movable member 21 in opposition to the quay wall 11, as the case may be.

Moreover, guide members 31 having an L-shaped cross-section are fixed to the rails 28 so that webs of the guide members 31 overlap the side edges of the flanges 26 of the movable member 21. In the operating portion 15 and at the center of a front wall of the movable member 21 is arranged an elastic end piece or fender 32 made of, for example, a rubber perpendicularly fixed to the front wall of the movable member and extending away from the quay wall. The end piece 32 is provided on a front end opposite to the movable member 21 with a contact plate 33 which is adapted to be in direct contact with a floating body on the surface of the water and is supported through wires 34 by columns 35 fixed on the movable member 21 to prevent deformation of the elastic end piece due to its self weight.

A cover member 36 extends over the movable member 21 from the upper portion of the gear box 13 and is adapted to be in contact with the upper wall of the movable member 21 and associated therewith by means of bolts and nuts, thereby effectively supporting the bending moments and horizontal forces acting upon the operating portion 15.

With the apparatus arranged as above described, when the floating body is desired to be supported in the center of a rectangular pit of the quay, the geared motor 12 is energized to rotate the screw threaded rods 14, so that the movable member 21 is moved together with the end piece 32 while being guided by the guide members 31, the rails 28 and the cover 36.

The moving distance of the end piece 32 can be determined by the revolutions per minute of the geared motor 12, the gear ratio of the gear train 13' and the pitch of the screw threaded rod 14 in consideration with the time while the geared motor 12 is being operated, so that the end piece can be exactly advanced to a desired position to bring it into contact with the surface of the floating body. The flanges 26 of the moving member 21 are then clamped to the rails 28 and the cover 36 by means of the bolts and nuts 29.

In this manner, the floating body is alway securely supported at a desired position by a plurality of restraining apparatus extending from the opposite quay walls in spite of unintensional errors produced when the quay wall was constructed, and the rocking energy due to wind and waves to which the floating body is subjected can be effectively absorbed by the elastic end pieces.

When the operating portions 15 of the apparatuses are positioned in place for restraining a floating body, they are preferably advanced somewhat excessively to an extent such that precompressive forces act somewhat onto the end pieces, with the result that the contact plates 32 are forced onto the floating body and not moveable from the surface of the floating body even if the floating body is rocked more or less, thereby more effectively absorbing the energy. The bolts and nuts 29 and screw threaded rods 14 also of course serve to support the load while the end pieces absorb the energy.

On the other hand, the operating portion 15 can easily be retracted by the reverse rotation of the geared motor 12 after releasing the bolts and nuts 29.

Furthermore, this restraining apparatus functions as a fender by previously extending the end pieces 32 toward or away from the quay wall, when a floating body is tugged into the pit of the quay wall.

The screw threaded rods may be any number and may be so constructed as to resist to great axial forces, and therefore the forces acting upon the end pieces can be supported only by the rods without using the bolts and nuts.

According to the present invention, therefore, the operating portion can be exactly advanced to a desired position and a floating body can be sufficiently restrained without requiring complicated sealing means as used in hydraulic cylinders and without being obstructed by rust on the screw threaded rods. In addition, the apparatus according to the present invention has an advantage of exhibiting the function of the apparatus much more sufficiently when a floating body is supported utilizing precompressive forces arising in the end pieces, which precompression could not be expected in any extending and retracting position adjusting means in the prior art.

Figure 4:
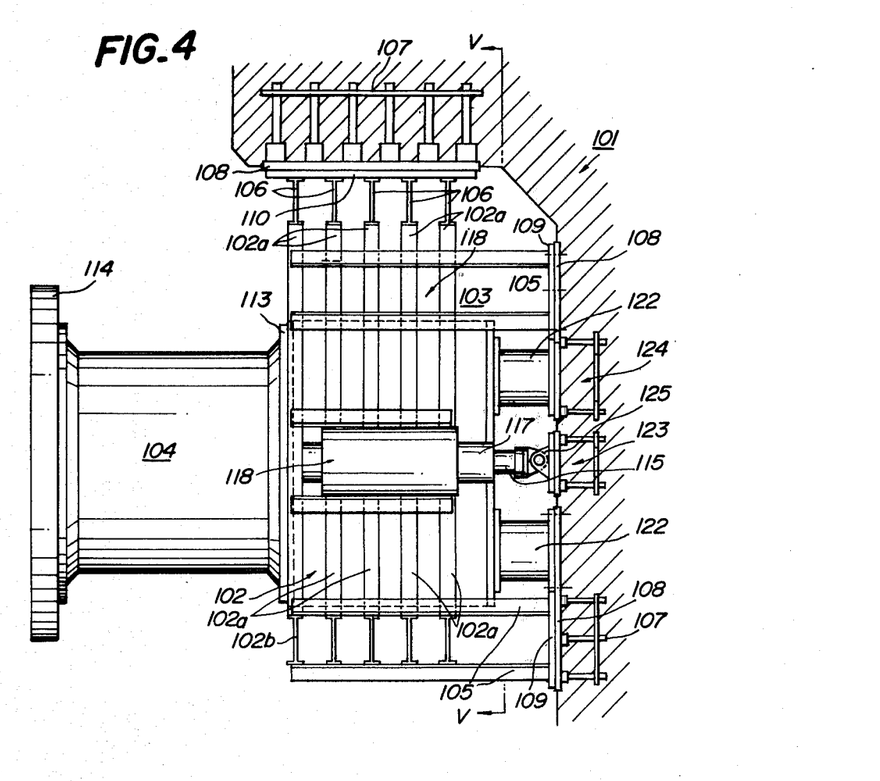
FIG. 4 is a front elevational view of another embodiment of a floating body restraining apparatus according to the invention.

FIG. 4 illustrates another embodiment of the invention, wherein there is shown a quay wall 101 having at its upper end a cover portion under which extends away from the quay wall a cylindrical frame structure 102 within which is slidable a core structure 103 having at its outer end an end piece or bumper 104 made of a rubber and the like.

The cylindrical frame structure 102 is rectangular cylindrical which consists of a plurality of I-shaped beams 102a vertically extending on both sides and laterally spaced apart to each other and a plurality of I-shaped beams 102b horizontally extending on upper and lower sides and laterally spaced apart to each other, adjacent ends of these beams being welded. The rear end of the rectangular cylindrical frame structure 102 is connected to a vertical wall of the quay by a plurality of horizontal extending angle beams 105 and the upper end of the frame structure 102 is connected to a horizontal wall of the cover portion of the quay by a plurality of horizontally extending I-shaped beams 106, thereby enabling the frame structure 102 to extend horizontally away from the quay wall 101.

For this purpose, it is preferable for maintenance to clamp plates 109 and 110 connected to the angle beams 105 and I-shaped beams 106 by means of bolts 111 to base plates 108 exposing at the surface of the quay wall 101 and integrally constructed with anchor members 107 previously embedded in the quay wall. The plates 110 are formed with positioning protrusions 112 adapted to engage with grooves of the base plates 108.

Within the rectangular frame structure 102 is loosely fitted and axially slidable the box-shaped core structure 103 substantially corresponding in configuration to the inner side of the rectangular frame structure. The core strucrure 103 is provided at its front end with a bumper or fender 104 secured thereto through a mounting plate 113. The bumper 104 is coaxially aligned with the core structure 103 and is provided at the end with a contact plate 114. The core structure 103 is connected at its rear end to a hydraulic cylinder 115 having a free end pivotally mounted to the quay wall 101.

Figure 6:
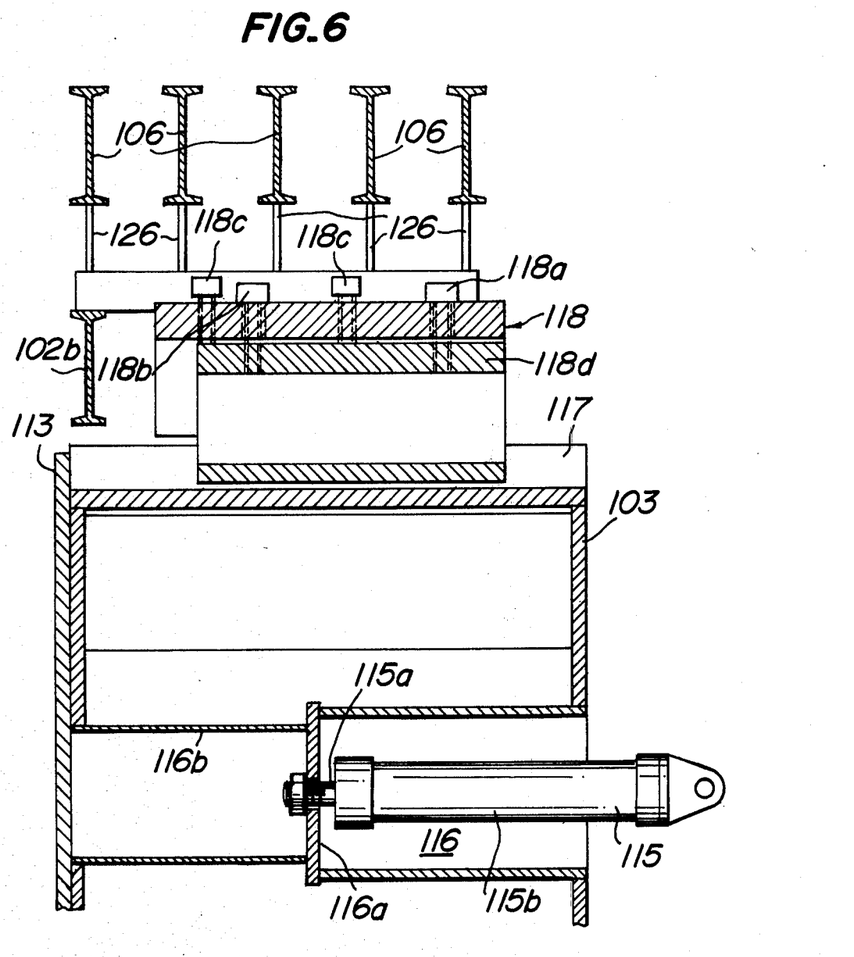
FIG. 6 is an enlarged crosssectional view of a core structure and load supporting means used in the apparatus shown in FIGS. 4 and 5.

When the hydraulic cylinder 115 is connected to the core structure 103 and the quay wall as shown in FIG. 6, it is preferable that a piston rod 115a of the cylinder 115 is connected to an end wall 116a of a rectangular recess 116 formed in the rear end of the core structure 103 and then the cylinder 115b is connected to the quay wall 101 to reduce chances for exposing the hydraulic cylinder 115 to rain or waves which will cause rust. A reinforcement cylinder 116b is connected to the end wall 116a for reinforcing the core structure 103.

Moreover, each of the upper and both side surfaces of the core structure 103 is formed with an axially extending groove 117 adapted to engage load support means 118 connected to the frame structure 102.

The load support means 118 extends along the groove 117 across the I-shaped beams 102a or 102b and projects toward the core structure 103. The load support means 118 comprises a channel-shaped support member 118a fixed to the I-shaped beams, and a hollow operating piece 118d fitted within a channel of the support member 118a with bolts 118b and 118c and adapted to engage the groove 117. The operating piece 118d is moved toward and away from the groove 117 by rotating the bolts 118b and is urged toward the groove 117 by means of the bolts 118c thereby preventing the bolts 118b from loosening and hence preventing the operating piece 118d from moving deviating from its set position.

Moreover, side walls of the groove 117 and the projecting end of the operating piece 118d are inclined at the same angle and a clearance is provided between the bottom of the groove 117 and the projecting end of the operating piece 118d. With such an arrangement, the loads in various directions acting upon the core structure 103 are effectively distributed by the respective operating pieces 118d and loads which act in the direction to retract the operating pieces 118d are reduced owing to the components caused by the inclined surfaces of the operating pieces.

Figure 5:
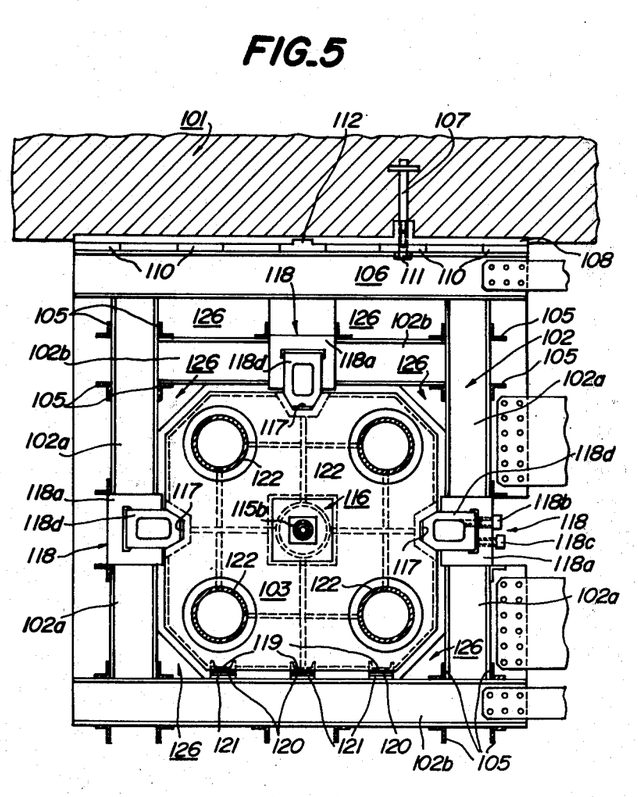
FIG. 5 is a sectional view taken along line V—V in FIG. 4.

In order to facilitate the sliding movement of the core structure 103, mounted on the bottom wall of the core structure 103 are three ridges 119 extending in the direction of the sliding movement of the core structure and adapted to engage rails 121 on the I-shaped beams 102b through slide ways 120 of an oilless antifriction material.

In order to keep the core structure 103 at a desired distance from the quay wall, after the core structure 103 has been moved to a desired position by means of the hydraulic cylinder 115, distance pieces 122 in the form of a cylinder having flanges are interposed between the rear end of the core structure 103 and the vertical wall of the quay wall 101 to connect the core structure to the quay wall 101. Since the distance between the core structure 122 and the quay wall 101 varies with each operation of the hydraulic cylinder, the distance pieces 122 should be replaced with other pieces of a different length or added with other pieces to accommodate the variation in distance between the core structure and quay wall.

Referring to FIG. 4, furthermore, bases 124 and an anchor member 123 are provided in the quay wall 101 for the distance pieces and the hydraulic cylinder 115 pivotally connected to the anchor member 123 by a bracket 125. The I-shaped beams are reinforced at their corners by triangular plates 126 (FIG. 5).

In operation of the apparatus thus assembled, first a hydraulic pressure is supplied to the hydraulic cylinder 115 from a hydraulic source (not shown) to move the piston rod 115a toward and away from the quay wall, thereby causing the core structure 103 and bumper 104 to move to a desired position. These movements of the core structure 103 are easily effected with a relatively small force with the aid of the slide ways 120 of the antifriction material.

When the core structure 103 is positioned in place for restraining a floating body, the core structure is preferably advanced somewhat excessively to an extent such that the contact plate 114 abuts against the floating body and a precompressive force acts somewhat onto the bumper 104. If the precompressive force acts slightly or does not act at all onto the bumper 104, the floating body will repeatedly separate from and abut against the contact plate 114 due to slight wind and waves, while if the precompressive force acts excessively on the bumper, the bumper will not deform in spite of strong wind and waves so that sufficient energy absorption could not be effected.

Then, the bolts 118b and 118c of the load support means 118 are adjusted to enable the projecting ends of the operating pieces 118d to engage the grooves 117 of the core structure 103 thereby eliminating any play of the core structure within the frame structure 102.

Between the rear end surface of the core structure 103 and the vertical wall of the quay 101 are then interposed the four distance pieces 122 having a length corresponding to the distance therebetween. The flanges of these distance pieces 122 are then fixed to the quay wall 101 and the rear end surface of the core structure 103 by means of bolts and the like to hold the core structure 103 and the bumper 104 in place.

By operating a plurality of the restraining apparatuses arranged at the quay wall in the same manner, the floating body or vessel located in a harbor is securely supported and always held in place in the harbor because the rocking energy due to wind and waves is effectively absorbed by the bumpers 104 of the respective restraining apparatuses.

In other words, after a complete positioning of the floating body the axial forces of the bumper 104 acting upon the contact plate 114 are absorbed by the elastic deformation of the bumper 104 and supported by the core structure 103 and distance pieces 122, and the forces acting upon the bumper 104 other than the axial forces, that is, bending or torsional forces are firmly supported by the load support means 118. With this arrangement the core structure 103 never moves within the frame structure 102 and satisfactory energy absorption is achieved without any excessive force acting upon the hydraulic cylinder 115.

While the present invention has been explained with reference to the embodiments shown in attached drawings, it will be understood that the invention is not limited thereto but may be otherwise various embodied within the scope of the invention. For example, the frame structure may be supported by portions of the quay wall extending thereunder and may be cylindrical having a crosssection other than the rectangular section.

The floating body restraining apparatus effectively accommodates the tolerances or unintensional errors produced when the quay wall is constructed and sufficiently absorbs the rocking energy of a floating body or vessel on the water surface to hold firmly it in place in a harbor.

What is claimed is:

1. An apparatus for restraining a floating body at a quay wall comprising; a bumper, a hydraulic piston and cylinder assembly having a movable member coupled to said bumper to adjust the distance between said bumper and said quay wall and, distance pieces selectively interposed between said movable member and said quay wall for permanently maintaining said distance constant and independent of hydraulic pressure in said hydraulic piston and cylinder assembly, wherein at least two walls of said quay wall are connected to a cylindrical frame structure as guide means extending away from the quay wall for said movable member, said cylindrical frame structure having a cylindrical space within which is axially slidably arranged a core structure constructed as said movable member which is connected by said hydraulic piston and cylinder assembly to said quay wall, each of at least the upper and both side surfaces of said core structure is formed with an axially extending groove which engages a respective load support means connected to the frame structure and extending along the grooves of the core structure, sidewalls of said grooves and an end of said respective load support means are inclined at the same angle and a clearance is provided between a bottom of said grooves and the end of said respective load support means and, said cylindrical frame structure comprising a plurality of beams extending vertically and horizontally to form a rectangular cylinder within which is loosely fitted said core structure of a box-shaped structure.

2. An apparatus as set forth in claim 1, wherein a piston rod of said hydraulic piston and cylinder assembly is connected to an end wall of a rectangular recess formed in a rear end of said core structure and a cylinder of said piston and cylinder assembly is connected to said quay wall.

3. An apparatus as set forth in claim 1, wherein said distance pieces in the form of a cylinder having flanges are interposed between a rear end of said core structure and a vertical wall of said quay wall after said core structure has been moved to a desired position for restraining said floating body in order to keep a distance between said core structure and said quay wall.

* * * * *